United States Patent
Sokeila et al.

(10) Patent No.: US 10,708,571 B2
(45) Date of Patent: Jul. 7, 2020

(54) VIDEO FRAME PROCESSING

(71) Applicant: Microsoft Technology Licensing, LLC, Redmond, WA (US)

(72) Inventors: Tomi Sokeila, Kirkland, WA (US); Klaus Melakari, Oulu (FI); Mikko Muukki, Tampere (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 187 days.

(21) Appl. No.: 14/754,018

(22) Filed: Jun. 29, 2015

(65) Prior Publication Data

US 2016/0379374 A1   Dec. 29, 2016

(51) Int. Cl.
*H04N 13/204* (2018.01)
*H04N 5/232* (2006.01)
*G06T 5/00* (2006.01)
*G06T 7/246* (2017.01)
*H04N 13/10* (2018.01)

(52) U.S. Cl.
CPC .......... *H04N 13/204* (2018.05); *G06T 5/003* (2013.01); *G06T 7/246* (2017.01); *H04N 5/23229* (2013.01); *H04N 5/23254* (2013.01); *G06T 2207/10021* (2013.01); *G06T 2207/20201* (2013.01); *G06T 2207/30244* (2013.01); *H04N 13/10* (2018.05)

(58) Field of Classification Search
CPC ............ H04N 5/23254; H04N 5/2353; H04N 13/0018; H04N 13/0022; H04N 13/0203; H04N 13/0239; H04N 5/147; H04N 5/21; H04N 7/0137; H04N 13/10; G06T 9/004; G06T 2207/10012; G01C 7/00; G06K 9/6217; G06K 9/66; A61B 6/466; G06F 3/04815

USPC .............. 348/43, 56, 46, 47, 451, 452, 700; 345/419, 422; 375/240.13; 382/236, 382/154, 159, 201; 386/227

See application file for complete search history.

(56) References Cited

U.S. PATENT DOCUMENTS 5,598,515 A * 1/1997 Shashua .................. G06T 15/10
                                                                345/419
5,933,535 A * 8/1999 Lee ........................ G06F 17/153
                                                                345/648

(Continued)

FOREIGN PATENT DOCUMENTS

WO      2015010244 A1    1/2015

OTHER PUBLICATIONS

Liu, et al., "Video Stabilization with a Depth Camera", in Proceedings of the IEEE Conference on Computer Vision and Pattern Recognition, Jun. 16, 2012, pp. 89-95.

(Continued)

*Primary Examiner* — Thai Q Tran
*Assistant Examiner* — Syed Y Hasan (57) ABSTRACT

An apparatus for or processing video frames is presented. The apparatus comprises at least one processing unit and at least one memory. The at least one memory stores program instructions that, when executed by the at least one processing unit, cause the apparatus to segment objects appearing in video frames, model movement of a camera recording the video frames, and individually compensate motion artefacts in the video frames for at least one segmented object based on relative movement of the camera and at least one segmented object.

20 Claims, 4 Drawing Sheets

(56) References Cited

U.S. PATENT DOCUMENTS

| | | | |
|---|---|---|---|
| 6,130,964 A * | 10/2000 | Marques | G06T 7/215 |
| | | | 375/E7.195 |
| 6,738,424 B1 | 5/2004 | Allmen et al. | |
| 6,842,196 B1 * | 1/2005 | Swift | G06T 5/20 |
| | | | 348/451 |
| 6,985,620 B2 | 1/2006 | Sawhney et al. | |
| 7,193,633 B1 | 3/2007 | Reinhardt et al. | |
| 8,531,504 B2 | 9/2013 | Nestares et al. | |
| 8,749,644 B2 | 6/2014 | Lee et al. | |
| 8,786,716 B2 | 7/2014 | Zhou | |
| 8,885,021 B2 | 11/2014 | Oskam et al. | |
| 8,891,625 B2 | 11/2014 | Chen et al. | |
| 8,896,713 B2 | 11/2014 | Corey et al. | |
| 8,964,041 B2 | 2/2015 | Forssen et al. | |
| 2007/0183497 A1 | 8/2007 | Luo et al. | |
| 2008/0095436 A1 | 4/2008 | Kim et al. | |
| 2009/0087085 A1 * | 4/2009 | Eaton | G06F 15/16 |
| | | | 382/159 |
| 2009/0278921 A1 | 11/2009 | Wilson | |
| 2010/0092032 A1 * | 4/2010 | Boca | B25J 9/1679 |
| | | | 382/103 |
| 2010/0098324 A1 * | 4/2010 | Fujieda | B25J 9/1697 |
| | | | 382/154 |
| 2010/0150238 A1 * | 6/2010 | Watanabe | H04N 19/00 |
| | | | 375/240.13 |
| 2011/0007939 A1 | 1/2011 | Teng et al. | |
| 2012/0196679 A1 * | 8/2012 | Newcombe | A63F 13/06 |
| | | | 463/36 |
| 2012/0249740 A1 * | 10/2012 | Lee | H04N 13/0207 |
| | | | 348/46 |
| 2014/0184496 A1 | 7/2014 | Gribetz et al. | |
| 2014/0267801 A1 | 9/2014 | Grundmann et al. | |
| 2014/0363096 A1 | 12/2014 | Zhou et al. | |
| 2015/0063695 A1 | 3/2015 | Pulli | |
| 2015/0199994 A1 * | 7/2015 | Thorn | G11B 27/10 |
| | | | 386/227 |
| 2015/0304640 A1 * | 10/2015 | Brooks | H04N 13/0011 |
| | | | 348/56 |
| 2016/0360111 A1 * | 12/2016 | Thivent | H04N 5/23287 |

OTHER PUBLICATIONS

Agrawal, et al., "Moving Object Segmentation and Dynamic Scene Reconstruction Using Two Frames", in Proceedings of IEEE International Conference on Acoustics, Speech, and Signal Processing, vol. 2, Mar. 18, 2005, 4 pages.

Jia, et al., "Probabilistic 3-D Motion Estimation for Rolling Shutter Video Rectification from Visual and Inertial Measurements", in Proceedings of IEEE 14th International Workshop on Multimedia Signal Processing, Sep. 17, 2012, 6 pages.

Liu, et al., "Content-Preserving Warps for 3D Video Stabilization", in Proceedings of ACM Transactions on Graphics, vol. 28, No. 3, Article 44, Aug. 2009, 9 pages.

"3D Reconstruction", Mar. 19, 2015 Available at: http://en.wikipedia.org/wiki/3D_reconstruction.

"International Search Report and Written Opinion Issued in PCT Application No. PCT/US2016/037467", dated Aug. 23, 2016, 12 Pages.

"3D Pose Estimation", downloaded on Mar. 16, 2018, 7 pages, Available at: https://en.wikipedia.org/wiki/3D_reconstruction.

* cited by examiner

VIDEO FRAME PROCESSING

BACKGROUND

Video stabilization aims to stabilize video frames of a video clip. There are various reasons why the video frames may need to be stabilized. For example, camera shake during a video recording may degrade the perceived video quality.

SUMMARY

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

In one embodiment, an apparatus is provided. The apparatus comprises at least one processing unit and at least one memory. The at least one memory stores program instructions that, when executed by the at least one processing unit, cause the apparatus to segment objects appearing in video frames, model movement of a camera recording the video frames, and individually compensate motion artefacts in the video frames for at least one segmented object based on relative movement of the camera and at least one segmented object.

In another embodiment, a method is provided. The method comprises segmenting objects appearing in video frames, modelling movement of a camera recording the video frames, and individually compensating motion artefacts in the video frames for at least one segmented object based on relative movement of the camera and at least one segmented object.

In another embodiment, an apparatus is provided. The apparatus comprises at least one processing unit and at least one memory. The at least one memory stores program instructions that, when executed by the at least one processing unit, cause the apparatus to obtain a file comprising video frames, obtain information relating to a camera that was used to record the video frames, segment objects appearing in the video frames, model movement of the camera based on at least the information relating to the camera; and individually compensate motion artefacts in the video frames for at least one segmented object based on relative movement of the camera and at least one segmented object.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples. Furthermore, as used in this application and in the claims, the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items.

Figure 1:
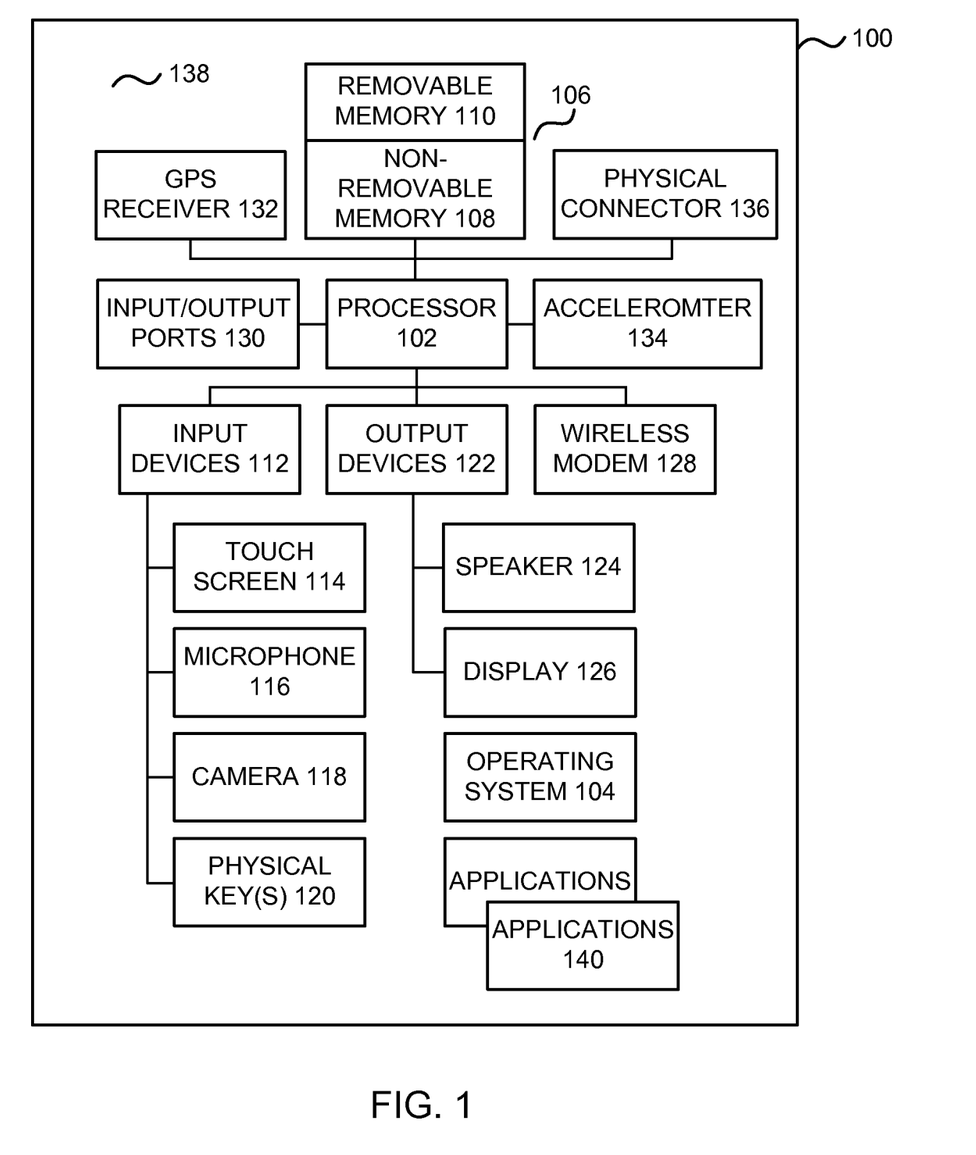
FIG. 1 is a system diagram depicting an apparatus including a variety of optional hardware and software components.

FIG. 1 is a system diagram depicting an apparatus 100 for recording and processing video frames including a variety of optional hardware and software components, shown generally at 138. Any components 138 in the apparatus 100 can communicate with any other component, although not all connections are shown, for ease of illustration. The apparatus 100 can be any of a variety of computing devices that includes a camera (for example, a digital camera, a cell phone, a smartphone, a handheld computer, a tablet computer, a Personal Digital Assistant (PDA), etc.).

The illustrated apparatus 100 can include a controller or processor 102 (e.g., signal processor, microprocessor, ASIC, or other control and processing logic circuitry) for performing such tasks as signal coding, data processing, input/output processing, power control, and/or other functions. An operating system 104 can control the allocation and usage of the components 138 and support for one or more application programs 140. The application programs can include common mobile computing applications (e.g., email applications, calendars, contact managers, web browsers, messaging applications), or any other computing application.

The illustrated apparatus 100 can include a memory 106. The memory 106 can include non-removable memory 108 and/or removable memory 110. The non-removable memory 108 can include RAM, ROM, flash memory, a hard disk, or other well-known memory storage technologies. The removable memory 110 can include flash memory or a Subscriber Identity Module (SIM) card, which is well known in mobile communication systems, or other well-known memory storage technologies, such as "smart cards". The memory 106 can be used for storing data and/or code for running the operating system 104 and the applications 140. If the apparatus 100 is a mobile phone or smart phone, the memory 106 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The apparatus 100 can support one or more input devices 112, such as a touchscreen 114, microphone 116, camera 118 and/or physical keys or a keyboard 120 and one or more output devices 122, such as a speaker 124 and a display 126. Some devices can serve more than one input/output function. For example, the touchscreen 114 and the display 126 can be combined in a single input/output device. The input devices 112 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 104 or applications 140 can comprise speech-recognition software as part of a voice user interface that allows a user to operate the apparatus 100 via voice commands. Further, the apparatus 100 can comprise input devices and software that allows for user interaction via a user's spatial gestures, such as detecting and interpreting gestures to provide input to a gaming application.

A wireless modem 128 can be coupled to an antenna (not shown) and can support two-way communications between the processor 102 and external devices, as is well understood in the art. The modem 128 is shown generically and can include a cellular modem for communicating with the mobile communication network and/or other radio-based modems (e.g., Bluetooth or Wi-Fi). The wireless modem 128 is typically configured for communication with one or more cellular networks, such as a GSM network for data and voice communications within a single cellular network, a WCDMA (Wideband Code Division Multiple Access) network, an LTE (Long Term Evolution) network, a 4G LTE network, between cellular networks, or between the mobile apparatus and a public switched telephone network (PSTN) etc.

The apparatus 100 can further include at least one input/output port 130, a satellite navigation system receiver 132, such as a Global Positioning System (GPS) receiver, an accelerometer 134, and/or a physical connector 136, which can be a USB port, IEEE 1394 (FireWire) port, and/or RS-232 port. The illustrated components 138 are not required or all-inclusive, as any components can deleted and other components can be added.

Figure 2A:
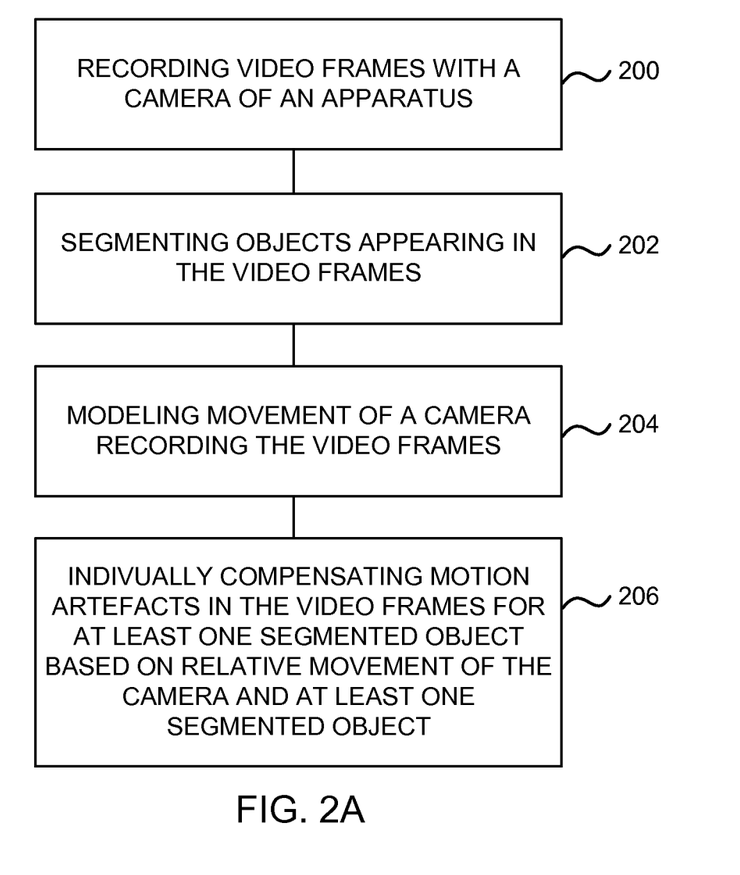
FIG. 2A is a flowchart illustrating one embodiment of a method for processing video frames.

FIG. 2A illustrates an embodiment of a method for processing video frames.

At 200 video frames are recorded with a video camera of an apparatus. The apparatus may be in any apparatus comprising a video camera, for example, a smart phone, a digital video camera recorder etc.

At 202 objects appearing in the video frames are segmented. The objects may be segmented using any appropriate technique. For example, the segmentation may comprise reconstructing the objects as three-dimensional objects using at least one of incremental photogrammetry (for example, the POSIT method) and a depth camera (for example, a time-of-flight camera, Lidar etc.). The three-dimensional object data may be represented as a three-dimensional voxel map or a polygonal mesh.

In one embodiment, segmenting an object from the video frames requires that boundaries of the object are approximated so that individual objects can be defined in comparison of each other and background. Segmentation can be done using several existing methods utilizing two-dimensional image and/or depth information etc.

In order to segment an object, pixels that belong to object may be distinguished from the pixels that do not belong to object. This can be done using any appropriate algorithm and/or technology. The intention is to find a common nominator or cost function for individual pixels in pixel group, i.e. an object, and then classify the group based on the connected pixels and their correlation with a selected parameter. Algorithms can operate based on information such as a shape, an edge, a pattern, a color, movement, parallax and depth. There exist also multiple different methods of defining a pixel group and calculating object correlation, for example, clustering, compression, region growing and neural network. Practical segmentation processes usually utilize several parameters and sometimes methods to maximize the accuracy and reliability.

Segmentation can made based on single image or series of the images and improve iteratively. This would be applicable in cases, where there is time variant correlation, for example, when a moving object suddenly stops. Movement could have been used to segment an object when there was movement, and then later this information can be used to maintain segmentation information for an already stopped object.

Segmentation algorithm(s) may be computationally heavy and their accuracy depends on available computation resources and quality of input data. In the simplest form, segmentation can be implemented based on plain camera image data and with software based real-time processing.

At 204 movement of the camera recording the video frames is modelled. The modelling may comprise modelling three-dimensional position of the camera in space using three-dimensional pose estimation. The modeling may also comprise using input from at least one accelerometer, gyroscope and/or a depth camera (for example, a time-of-flight camera, Lidar etc.). This provides information on how the camera is moving in the space. The modelling may also comprise using one or more sensors or sensing techniques, for example, based on capacitive sensing, ultrasound sensing etc.

Modelling of the movement of the camera may be based on a triangular coordinate system where the relative position and the viewpoint of the camera is estimated based on selected fixed coordinate points in space. The target is to form a series of coordinate points which are related to each other and thus reveal the camera's viewpoint path in the three-dimensional space.

A starting point may be a comparison of two or more video frames to find several common features that can be detected and "fixed" as marker points. Based on the change of the position of these marker points between successive video frames a parallax can be calculated and distance to these points can be resolved. By using distances to known points in image a camera position and viewpoint can be calculated. Based on the camera position then position of further points can be calculated and then additional distances to different fixed reference points can be known. When the camera moves, it constantly reveals new potential known reference points, and based on existing history and existing reference points the position and distance of the new reference points can be calculated. This enables a movement tracker to maintain the same coordinate system even while moving away from original viewpoint of the camera.

Camera path modeling depends on good quality reference points. Ideally there are multiple detectable features close to the camera, when the movement causes a major difference between the relative positioning of these points within successive video frames. To make the camera movement tracking more robust, tracking data can be augmented using depth information directly and/or gyroscopes to estimate camera movement. This reduces the need for high quality reference points.

Camera viewpoint path estimation can be computationally heavy and its accuracy depends on available computation resources and quality of input data. In the simplest form, the motion estimation can be done based on plain camera image data and with software based real-time processing.

At 206 motion artefacts in the video frames are individually compensated for at least one segmented object based on relative movement of the camera and at least one segmented object. Motion artefacts of a segmented object may be compensated based on the relative movement of the camera and the segmented object. In another embodiment, motion artefacts of a segmented object may be compensated based on the relative movement of the camera and a plurality of segmented objects. Compensating may mean that movement of the camera is stabilized or that movement of one or more objects is stabilized in the video frames.

Figure 2B:
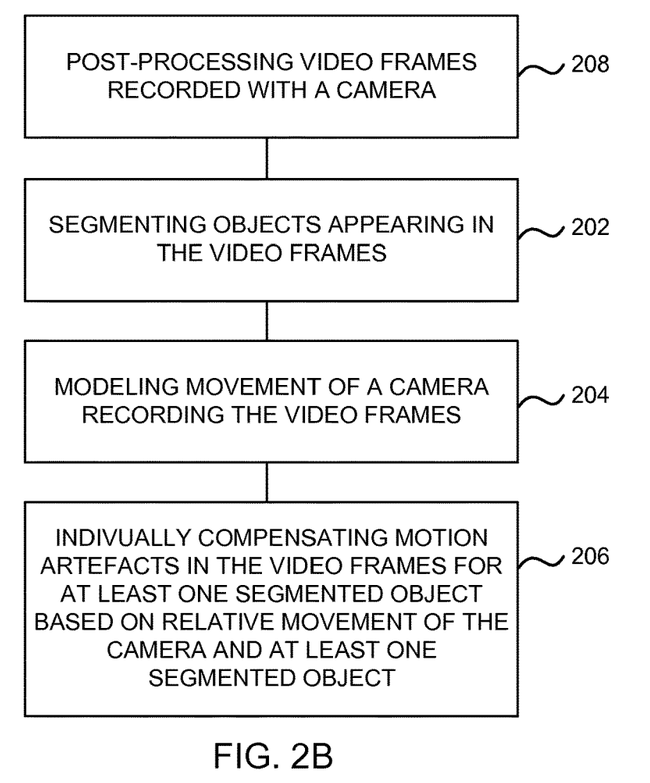
FIG. 2B is a flowchart illustrating another embodiment of a method for processing video frames.

FIG. 2B illustrates another embodiment of a method for processing video frames. The embodiment disclosed in FIG. 2B is identical with the embodiment disclosed in FIG. 2A with the exception that in FIG. 2B at 208 video frames recorded with a camera are post-processed with an apparatus that did not itself record the video frames whereas in FIG. 2A the video frame processing is performed by the same apparatus that recorded the video frames. A file comprising video frames is obtained. Further, information relating to a camera that was used to record the video frames is obtained. In addition to the video frames, the apparatus performing the post-processing may have data, for example, from an accelerometer and a gyroscope of the apparatus that recorded the video frames and data from a depth camera for modelling movement of the camera that recorded the video frames and for compensating motion artefacts in the video frames.

In one embodiment of FIG. 2A or 2B, intra frame motion artefacts are compensated. Examples of intra frame compensations include, for example, rolling shutter compensation and continuous autofocus.

Rolling shutter artefacts that cause distortion to object geometries are due to temporal distribution of readout of individual pixels. The term "rolling shutter" refers to a method in which each video frame is captured not by taking a snapshot of the entire scene at single instant in time but by scanning across the scene rapidly, either vertically or horizontally. This means that all parts of the image of the scene are not recorded at exactly the same instant. This in turn may cause distortion to object geometries, for example, to fast-moving objects.

Rolling shutter artefacts can be compensated if the movement of a camera can be calculated in relation to an object or objects. A time difference between each pixel can be compensated by estimating where each pixel would be if they would have been exposed at exactly same moment of time. Video may be more sensitive to rolling shutter artefacts than still images, since the varying amount of rolling shutter effect will have point of reference from nearest frames, and this can cause vertical lines to start moving between frames and cause wavy motion to video.

By using the combination of three-dimensional pose tracking and three-dimensional modeling and segmentation, it is possible to apply different levels of compensation to pixels that are from objects that have different relative movement to the camera with each other. This happens, for example, when several independent objects are moving in relation to the camera and thus have varying degree of rolling shutter effects.

Further, the camera may be shooting a scene with multiple objects that are moving in different directions, for example, a road with multiple cars driving in opposite directions. Since the cars are moving with different speeds and in different directions, the rolling shutter effect will appear differently with each moving object. Since object dimensions and relative movements with respect to the camera are known for the moving objects, it is possible to correct the rolling shutter effect for each object separately.

In another embodiment of FIG. 2A or 2B, inter frame motion artefacts are compensated. Inter frame artefacts from movement may not always be errors that need to be removed. Some intra frame movement may be desirable and some other movement may be very disturbing. When the movement of the camera is determined in relation to individual objects, it is possible to remove movement artefacts selectively. The movement artefacts may not always be completely removed, but rather reduced to level, that it no longer is considered to be disturbing. This may mean smoothing the motion by removing the highest frequency movement, for example, the camera shake.

In one embodiment of FIG. 2A or 2B, motion artefact compensation is illustrated using an example where two bicycles drive side by side on the road. A camera is assumed to be attached to one of the bicycles. If a camera view covers both bicycles and some of the background, there are multiple choices based on which stabilization can be made.

Traditional frame by frame based video stabilization tries to reduce the overall movement, and the end result is averaging the motion of all the objects in the camera view.

Pose tracking and object segmentation based approach enables different motion vectors to be detected between the objects and the camera and thus different objects can be segmented out and stabilized selectively.

In the bicycle example, the following alternatives are available:

stabilizing only camera movement, and the background appears steady stabilizing only the driver of the bicycle with the camera, and the driver appears steady stabilizing only the driver of the other bicycle so that it appears steady stabilizing both drivers so that the background appears to be shaking.

Figure 3A:
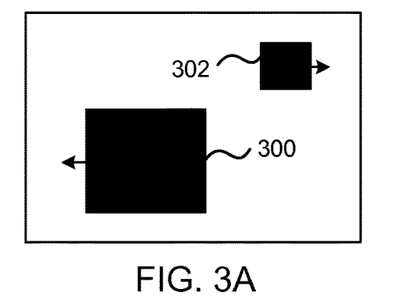
FIG. 3A is a block diagram illustrating one embodiment for compensating motion artefacts.
Figure 3B:
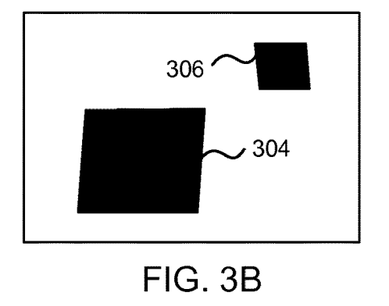
FIG. 3B is a block diagram illustrating one embodiment for compensating motion artefacts.
Figure 3C:
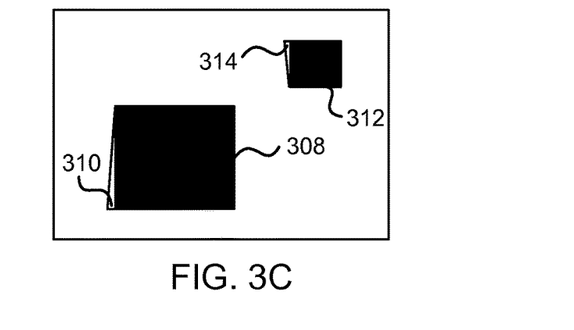
FIG. 3C is a block diagram illustrating one embodiment for compensating motion artefacts.

FIGS. 3A-3C illustrate an embodiment for compensating motion artefacts in video frames for at least one segmented object based on relative movement of a camera and at least one segmented object. FIG. 3A illustrates two segmented objects 300, 302 moving in different directions.

In this embodiment, the rolling shutter will create different amounts of errors to the segmented objects 300, 302 that are moving in relation to a camera recording the objects. The reason for the errors may be that the lines of the images are captured in different points of time and therefore the pixel lines of the moving objects 300, 302 have shifted from one line to another. FIG. 3B illustrates the situation when the pixel lines of the moving objects 300, 302 have shifted from one line to another, thus resulting in distorted objects 304, 306.

Since the movement of the objects 300, 302 is known, it is possible to compensate the error of each object 300, 302 by shifting the parts of the lines that has the object visible according to the detected movement. Since the total movement of the objects 300, 302 in relation to the camera is also known, it is possible to perform the correction in the three-dimensional space. After the correction the objects will represent their real shape instead of the twisted or tilted view, as illustrated by objects 308, 312 in FIG. 3C.

In some cases it is possible that the shifting or twisting of the object back to its original share will leave holes 310, 314 in the view, but those can be compensated, for example, with intelligent background filling algorithms.

Although this embodiment illustrates only two objects moving in opposite directions in the two-dimensional plane, the same procedure can be applied to objects moving to any direction in the three-dimensional space.

Similarly in video stabilization each object can be stabilized to any other point of object in the same space. Each object is moved in the view to provide the most optimal motion path by moving the segmented object in the three-dimensional space. The resulting possible empty holes may then be filled either by magnifying the object or intelligently filling the caps based on the data from previous or coming video frames.

Figure 4:
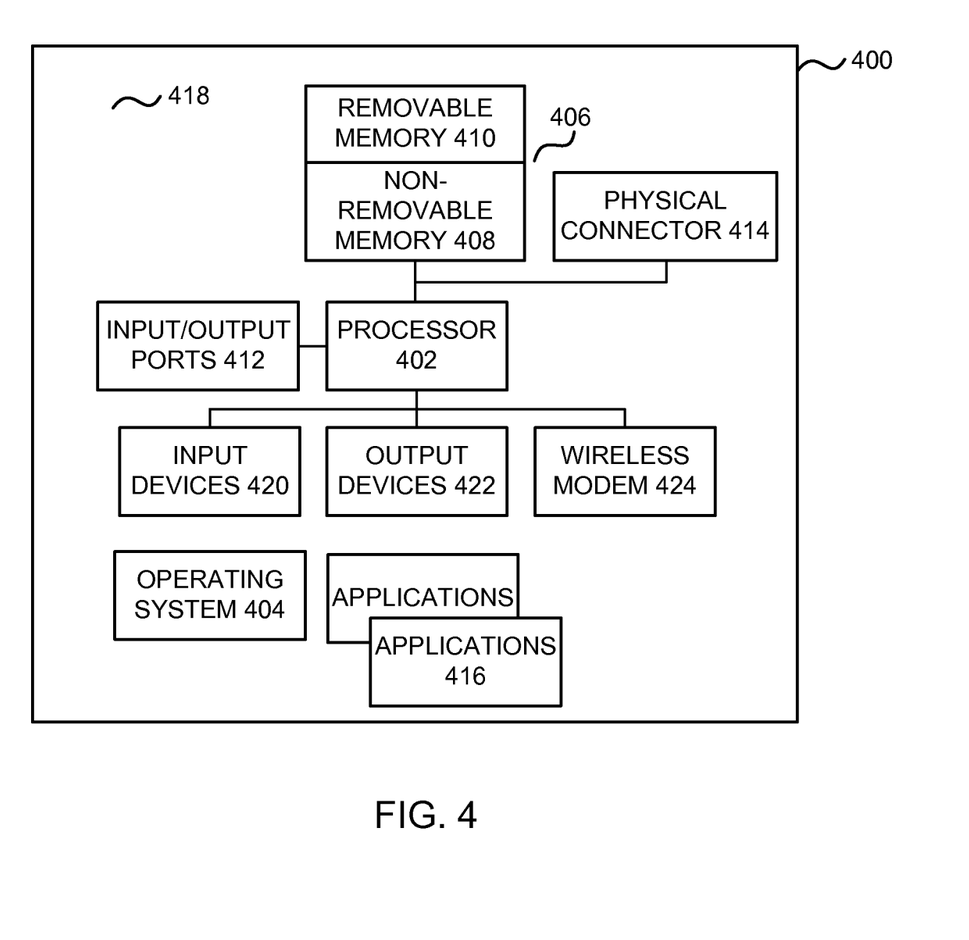
FIG. 4 is another system diagram depicting an apparatus including a variety of optional hardware and software components.

FIG. 4 is a system diagram depicting an apparatus 400 for processing recorded video frames including a variety of optional hardware and software components, shown generally at 418. Any components 418 in the apparatus 400 can communicate with any other component, although not all connections are shown, for ease of illustration. The apparatus 400 can be any of a variety of computing devices, for example, a cell phone, a smartphone, a handheld computer, a tablet computer, a Personal Digital Assistant (PDA), a server computer, a desktop computer etc. The apparatus 400 has not itself recorded the video frames but only post-processes them.

The illustrated apparatus 400 can include a controller or processor 402 (e.g., signal processor, microprocessor, ASIC, or other control and processing logic circuitry) for performing such tasks as signal coding, data processing, input/output processing, power control, and/or other functions. An operating system 404 can control the allocation and usage of the components 418 and support for one or more application programs 416. The application programs can include common mobile computing applications (e.g., email applications, calendars, contact managers, web browsers, messaging applications), or any other computing application.

The illustrated apparatus 400 can include a memory 406. The memory 406 can include non-removable memory 408 and/or removable memory 410. The non-removable memory 408 can include RAM, ROM, flash memory, a hard disk, or other well-known memory storage technologies. The removable memory 410 can include flash memory or other well-known memory storage technologies, such as "smart cards". The memory 406 can be used for storing data and/or code for running the operating system 404 and the applications 440.

The apparatus 400 can support one or more input devices 420, such as a touchscreen, microphone, camera and/or physical keys or a keyboard and one or more output devices 422, such as a speaker and a display. Some devices can serve more than one input/output function. For example, the touchscreen and the display can be combined in a single input/output device. The input devices 420 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 404 or applications 416 can comprise speech-recognition software as part of a voice user interface that allows a user to operate the apparatus 400 via voice commands. Further, the apparatus 400 can comprise input devices and software that allows for user interaction via a user's spatial gestures, such as detecting and interpreting gestures to provide input to a gaming application.

A wireless modem 424 can be coupled to an antenna (not shown) and can support two-way communications between the processor 402 and external devices, as is well understood in the art. The modem 424 is shown generically and can include a cellular modem for communicating with the mobile communication network and/or other radio-based modems (e.g., Bluetooth or Wi-Fi). The wireless modem 424 is typically configured for communication with one or more cellular networks, such as a GSM network for data and voice communications within a single cellular network, a WCDMA (Wideband Code Division Multiple Access) network, an LTE (Long Term Evolution) network, a 4G LTE network, between cellular networks, or between the mobile apparatus and a public switched telephone network (PSTN) etc.

The apparatus 400 can further include at least one input/output port 412 and/or a physical connector 414, which can be a USB port, IEEE 1394 (FireWire) port, and/or RS-232 port. The illustrated components 418 are not required or all-inclusive, as any components can deleted and other components can be added.

An embodiment of an apparatus comprises at least one processing unit, at least one memory, wherein the at least one memory stores program instructions that, when executed by the at least one processing unit, cause the apparatus to segment objects appearing in video frames, model movement of a camera recording the video frames, and individually compensate motion artefacts in the video frames for at least one segmented object based on relative movement of the camera and at least one segmented object.

In one embodiment, the at least one memory stores program instructions that, when executed by the at least one processing unit, when segmenting objects appearing in video frames, cause the apparatus to segment the objects based on at least one of shape, edge, pattern, color, motion and depth of the objects.

In one embodiment, alternatively or in addition, the at least one memory stores program instructions that, when executed by the at least one processing unit, when segmenting objects appearing in video frames, cause the apparatus to reconstruct the objects as three-dimensional objects using at least one of incremental photogrammetry and a depth camera.

In one embodiment, alternatively or in addition, the at least one memory stores program instructions that, when executed by the at least one processing unit, when modeling movement of a camera recording the video frames, cause the apparatus to model three-dimensional position of the camera in space using three-dimensional pose estimation.

In one embodiment, alternatively or in addition, the at least one memory stores program instructions that, when executed by the at least one processing unit, when modeling movement of a camera recording the video frames, cause the apparatus to model three-dimensional position of the camera in space using data from a depth camera.

In one embodiment, alternatively or in addition, the at least one memory stores program instructions that, when executed by the at least one processing unit, when segmenting objects appearing in video frames, cause the apparatus to compensate motion artefacts differently for different segmented objects.

In one embodiment, alternatively or in addition, the at least one memory stores program instructions that, when executed by the at least one processing unit, when segmenting objects appearing in video frames, cause the apparatus to compensate intra frame motion artefacts comprising at least one of rolling shutter artefacts and continuous autofocus artefacts.

In one embodiment, alternatively or in addition, the at least one memory stores program instructions that, when executed by the at least one processing unit, when segmenting objects appearing in video frames, cause the apparatus to compensate inter frame motion artefacts.

In one embodiment, alternatively or in addition, the at least one memory stores program instructions that, when executed by the at least one processing unit, when segmenting objects appearing in video frames, cause the apparatus to select at least one segmented object of the segmented objects, and compensate motion artefacts in the video frames for the at least one segmented object based on relative movement of the camera and the at least one segmented object.

In one embodiment, alternatively or in addition, the at least one memory stores program instructions that, when executed by the at least one processing unit, when segmenting objects appearing in video frames, cause the apparatus to stabilize camera movement in the video frames.

An embodiment of a method comprises segmenting objects appearing in video frames, modelling movement of a camera recording the video frames, and individually compensating motion artefacts in the video frames for at least one segmented object based on relative movement of the camera and at least one segmented object.

In one embodiment, the method comprises segmenting the objects based on at least one of shape, edge, pattern, color, motion and depth of the objects.

In one embodiment, alternatively or in addition, the method comprises reconstructing the objects as three-dimensional objects using at least one of incremental photogrammetry and a depth camera.

In one embodiment, alternatively or in addition, the method comprises modelling three-dimensional position of the camera in space using three-dimensional pose estimation.

In one embodiment, alternatively or in addition, the method comprises compensating motion artefacts differently for different segmented objects.

In one embodiment, alternatively or in addition, the method comprises compensating intra frame motion artefacts comprising at least one of rolling shutter artefacts and continuous autofocus artefacts.

In one embodiment, alternatively or in addition, the method comprises compensating inter frame motion artefacts.

In one embodiment, alternatively or in addition, the method comprises selecting at least one segmented object of the segmented objects, and compensating motion artefacts in the video frames for the at least one segmented object based on relative movement of the camera and the at least one segmented object.

In one embodiment, alternatively or in addition, the method comprises stabilizing camera movement in the video frames.

An embodiment of an apparatus comprises at least one processing unit and at least one memory, wherein the at least one memory stores program instructions that, when executed by the at least one processing unit, cause the apparatus to obtain a file comprising video frames, obtain information relating to a camera that was used to record the video frames, segment objects appearing in the video frames, model movement of the camera based on at least the information relating to the camera; and individually compensate motion artefacts in the video frames for at least one segmented object based on relative movement of the camera and at least one segmented object.

In one embodiment, alternatively or in addition, the information relating to the camera comprises at least one of data from an accelerometer and data from a gyroscope.

An embodiment of a computer program comprises executable instructions for causing at least one processor of a computing apparatus to perform operations comprising segmenting objects appearing in video frames, modelling movement of a camera recording the video frames, and individually compensating motion artefacts in the video frames for at least one segmented object based on relative movement of the camera and at least one segmented object.

An embodiment of a computer-readable storage medium comprises executable instructions for causing at least one processor of a computing apparatus to perform operations comprising segmenting objects appearing in video frames, modelling movement of a camera recording the video frames, and individually compensating motion artefacts in the video frames for at least one segmented object based on relative movement of the camera and at least one segmented object.

An embodiment of a method comprises obtaining a file comprising video frames, obtaining information relating to a camera that was used to record the video frames, segmenting objects appearing in the video frames, modelling movement of the camera based on at least the information relating to the camera, and individually compensating motion artefacts in the video frames for at least one segmented object based on relative movement of the camera and at least one segmented object.

An embodiment of a computer program comprises executable instructions for causing at least one processor of a computing apparatus to perform operations comprising obtaining a file comprising video frames, obtaining information relating to a camera that was used to record the video frames, segmenting objects appearing in the video frames, modelling movement of the camera based on at least the information relating to the camera, and individually compensating motion artefacts in the video frames for at least one segmented object based on relative movement of the camera and at least one segmented object.

An embodiment of a computer-readable storage medium comprises executable instructions for causing at least one processor of a computing apparatus to perform operations comprising obtaining a file comprising video frames, obtaining information relating to a camera that was used to record the video frames, segmenting objects appearing in the video frames, modelling movement of the camera based on at least the information relating to the camera, and individually compensating motion artefacts in the video frames for at least one segmented object based on relative movement of the camera and at least one segmented object.

An embodiment of an apparatus comprises means for segmenting objects appearing in video frames, means for modelling movement of a camera recording the video frames; and means for individually compensating motion artefacts in the video frames for at least one segmented object based on relative movement of the camera and at least one segmented object.

An embodiment of an apparatus comprising means for obtaining a file comprising video frames, means for obtaining information relating to a camera that was used to record the video frames, means for segmenting objects appearing in the video frames, means for modelling movement of the camera based on at least the information relating to the camera, and means for individually compensating motion artefacts in the video frames for at least one segmented object based on relative movement of the camera and at least one segmented object.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

The functions described herein performed by a controller may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

Although the subject matter may have been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages.

Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification. In particular, the individual features, elements, or parts described in the context of one example, may be connected in any combination to any other example also.

The invention claimed is:

1. An apparatus, comprising:
   at least one processing unit;
   at least one memory;
   wherein the at least one memory stores program instructions that, when executed by the at least one processing unit, cause the apparatus to:
   segment objects appearing in video frames;
   model movement of a camera recording the video frames by:
      detecting a change in a position of selected points in a scene between successive video frames; and
      modeling a three-dimensional position of the camera in space using three-dimensional pose estimation based at least on the detected change in the position of the selected points;
   identifying motion artefacts for at least one segmented object in the video frames caused by a movement of the camera;
   individually correct one or more errors from the motion artefacts in the video frames for the at least one segmented object based on the modeled movement of the camera and the at least one segmented object;
   identifying one or more holes in the at least one segmented object based on individually correcting the one or more errors; and
   filling the one or more holes based on the data from previous or upcoming video frames.

2. An apparatus according to claim 1, wherein the at least one segmented is selected to not have correction applied to it.

3. An apparatus according to claim 1, wherein the at least one memory stores program instructions that, when executed by the at least one processing unit, when segmenting objects appearing in video frames, cause the apparatus to:
   reconstruct the objects as three-dimensional objects using at least one of incremental photogrammetry and a depth camera.

4. An apparatus according to claim 1, wherein the at least one memory stores program instructions that, when executed by the at least one processing unit, when modeling movement of a camera recording the video frames, cause the apparatus to:
   model three-dimensional position of the camera in space using data from a depth camera.

5. An apparatus according to claim 1, wherein the at least one memory stores program instructions that, when executed by the at least one processing unit, when individually compensating motion artefacts in the video frames, cause the apparatus to:

compensate motion artefacts differently for different segmented objects.

6. An apparatus according to claim 1, wherein the at least one memory stores program instructions that, when executed by the at least one processing unit, when individually compensating motion artefacts in the video frames, cause the apparatus to:
compensate intra frame motion artefacts comprising at least one of rolling shutter artefacts and continuous autofocus artefacts.

7. An apparatus according to claim 1, wherein the at least one memory stores program instructions that, when executed by the at least one processing unit, when individually compensating motion artefacts in the video frames, cause the apparatus to:
compensate inter frame motion artefacts.

8. An apparatus according to claim 1, wherein the at least one memory stores program instructions that, when executed by the at least one processing unit, when compensating inter frame motion artefacts, cause the apparatus to:
select at least one segmented object of the segmented objects; and
compensate motion artefacts in the video frames for the at least one segmented object based on relative movement of the camera and the at least one segmented object.

9. An apparatus according to claim 1, wherein the at least one memory stores program instructions that, when executed by the at least one processing unit, when individually compensating motion artefacts in the video frames, cause the apparatus to:
stabilize camera movement in the video frames.

10. A method comprising:
segmenting objects appearing in video frames;
modelling movement of a camera recording the video frames by:
  detecting a change in a position of selected points in a scene between successive video frames; and
  modeling a three-dimensional position of the camera in space using three-dimensional pose estimation based at least on the detected change in the position of the selected points;
identifying motion artefacts for at least one segmented object in the video frames caused by a movement of the camera;
individually correcting one or more errors from the motion artefacts in the video frames for that least one segmented object based on the modeled movement of the camera and at least one segmented object;
identifying one or more holes in the at least one segmented object based on individually correcting the one or more errors; and
filling the one or more holes based on the data from previous or upcoming video frames.

11. A method according to claim 10, comprising:
segmenting the objects based on at least one of shape, edge, pattern, color, motion and depth of the objects.

12. A method according to claim 10, comprising:
reconstructing the objects as three-dimensional objects using at least one of incremental photogrammetry and a depth camera.

13. A method according to claim 10, comprising:
compensating motion artefacts differently for different segmented objects.

14. A method according to claim 10, comprising:
compensating intra frame motion artefacts comprising at least one of rolling shutter artefacts and continuous autofocus artefacts.

15. A method according to claim 10, comprising:
compensating inter frame motion artefacts.

16. A method according to claim 10, comprising:
selecting at least one segmented object of the segmented objects; and
compensating motion artefacts in the video frames for the at least one segmented object based on relative movement of the camera and the at least one segmented object.

17. A method according to claim 10, comprising:
stabilizing camera movement in the video frames.

18. An apparatus, comprising:
at least one processing unit;
at least one memory;
wherein the at least one memory stores program instructions that, when executed by the at least one processing unit, cause the apparatus to:
obtain a file comprising video frames;
obtain information relating to a camera that was used to record the video frames;
segment objects appearing in the video frames;
model movement of the camera based on at least the information relating to the camera by:
  detecting a change in a position of selected points in a scene between successive video frames; and
  modeling a three-dimensional position of the camera in space using three-dimensional pose estimation based at least on the detected change in the position of the selected points;
identify motion artefacts for at least one segmented object in the video frames caused by a movement of the camera;
individually correct one or more errors from the motion artefacts in the video frames for the at least one segmented object based on the modeled movement of the camera and at least one segmented object;
identifying one or more holes in the at least one segmented object based on individually correcting the one or more errors; and
filling the one or more holes based on the data from previous or upcoming video frames.

19. The apparatus according to claim 18, wherein the at least one memory stores program instructions that, when executed by the at least one processing unit, when segmenting objects appearing in video frames, cause the apparatus to:
segment the objects based on depth of the objects.

20. The apparatus according to claim 18, wherein the at least one memory stores program instructions that, when executed by the at least one processing unit, when segmenting objects appearing in video frames, cause the apparatus to:
reconstruct the objects as three-dimensional objects using at least one of incremental photogrammetry and a depth camera.

* * * * *